UNITED STATES PATENT OFFICE.

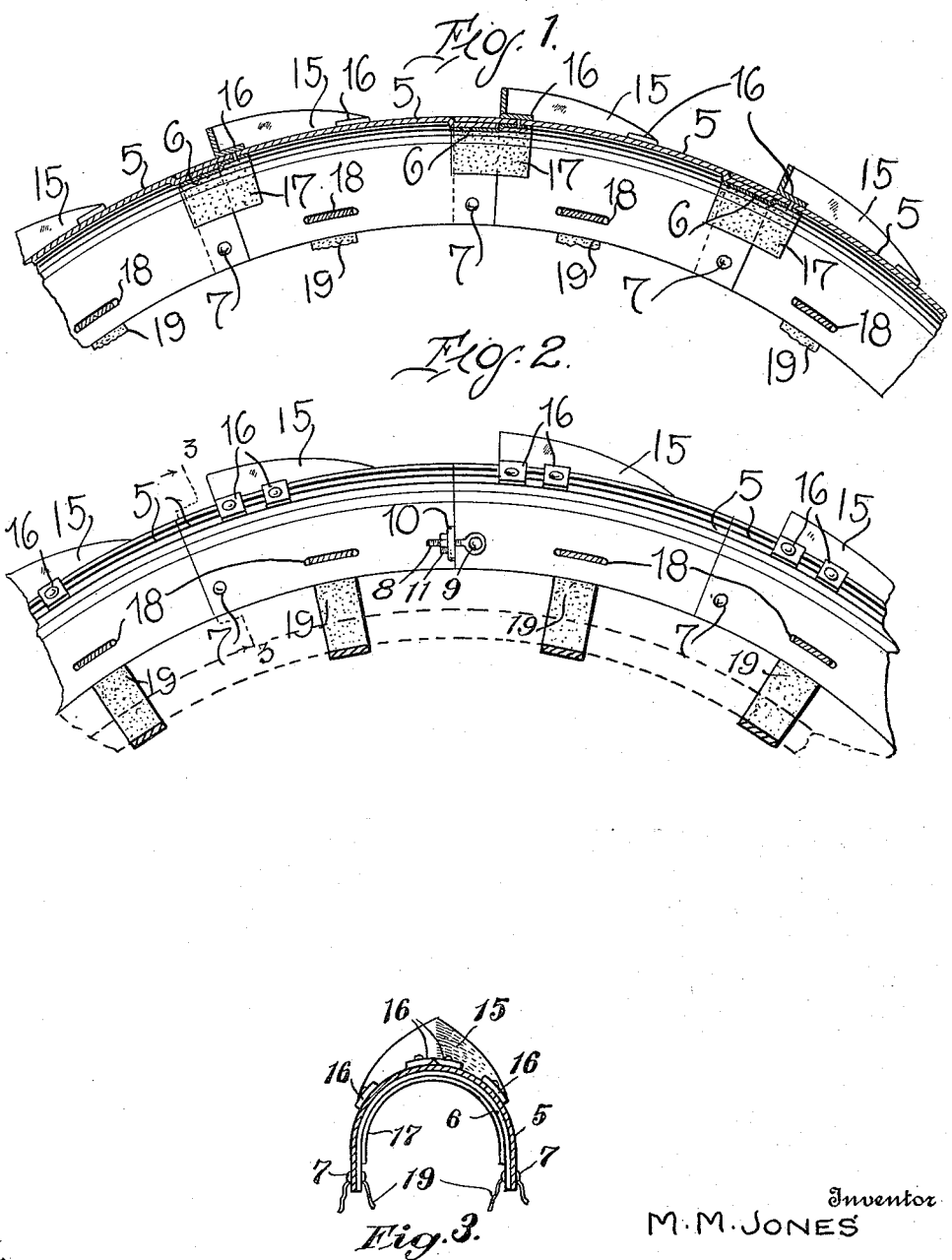

MARVEL M. JONES, OF DENVER, MISSOURI.

ARMOR FOR VEHICLE-WHEELS.

1,146,076. Specification of Letters Patent. Patented July 13, 1915.

Application filed September 4, 1914. Serial No. 860,219.

*To all whom it may concern:*

Be it known that I, MARVEL M. JONES, a citizen of the United States, residing at Denver, in the county of Worth and State of Missouri, have invented certain new and useful Improvements in Armor for Vehicle-Wheels, of which the following is a specification, reference being had to the accompanying drawings.

This invention relates to certain new and useful improvements in tire armors and has for its primary object to provide a device of this character which may be very easily and quickly applied to a wheel tire and will effectively prevent skidding of the wheel upon muddy or slippery road surfaces.

The invention has for a more particular object to provide a tire armor composed of a plurality of steel tread plates pivotally connected together adjacent to their longitudinal edges and at opposite ends, and an improved gripping member carried by each of said plates.

The invention has for a further general object to provide a tire armor, which is highly convenient and durable in practical use, as well as simple and inexpensive in its construction.

With the above and other objects in view, the invention consists in novel features of construction, combination and arrangement of parts as will be hereinafter referred to and more particularly pointed out in the specification and claim.

For a full understanding of the invention, reference is to be had to the following description and accompanying drawings, in which:

Figure 1 is an enlarged longitudinal section of the device, Fig. 2 is a detail fragmentary side elevation thereof showing the means for connecting the series of tread plates together upon the tire, Fig. 3 is a transverse section taken on the line 3—3 of Fig. 2.

Referring in detail to the drawings 5 designates a series of steel tread plates, which are of substantially semi-circular form in cross section. Each of these plates at one of its ends is inwardly offset as indicated at 6. This offset end of one of the plates extends beneath the relatively opposite end of an adjacent tread plate, as clearly shown in Fig. 3. Thus the outer surfaces of the series of plates are flush with each other. These plates at their engaged ends and adjacent to their longitudinal edges are pivotally connected together by the rivets 7. One of the end plates of the series is provided with threaded bolts 8, which are loosely engaged at one of their ends upon the stud bolts 9 fixed in opposite sides of the plate. These threaded bolts are adapted for engagement in the apertured lugs 10 provided upon opposite sides of the other end plate in the series, and nuts 11 are threaded upon said bolts for clamping engagement against the lugs. In this manner the plates are connected together in a continuous circular series. Upon each plate of the rear tire armor I provide gripping members 15. These members are of substantially V shape form and they are also provided with attaching tongues 16 to be riveted upon the armor plates. The outer longitudinal edges of the gripping members 15 are gradually tapered toward the divergent ends of the same. From the above it will be readily apparent that should the vehicle traverse a muddy road, the gripping members will effectively engage in the same.

As an additional means for retaining the tire armor upon the wheel, I provide each of the plates 5, adjacent to each longitudinal edge with a slot 18, to which one end of a strap, or other flexible element 19 is adapted to be attached. This strap passes around the felly of the wheel whereby the armor is securely held against outward movement with respect to the wheel tire.

From the foregoing description taken in connection with the accompanying drawings, the construction, manner of operation and several advantages of my invention will be obvious. The armor may be very easily and quickly applied to the wheel tire, when muddy or slippery roads are to be traversed by the vehicle and the gripping members which are provided upon each plate of the armor enable the wheel to obtain the necessary purchase upon the road surface so as to drive the machine. The steel armor plates also overcome all possibility of puncture of the pneumatic tire, thereby materially reducing the expense incident to the maintenance of automobiles and similar motor vehicles. In view of the extreme simplicity of my improved armor it will be manifest that the same is very durable and efficient in operation and may be manufactured at a comparatively small cost.

While I have described the preferred form, construction and arrangement of the several elements employed, it will be understood that the device is, nevertheless, susceptible of considerable modification therein, and I therefore reserve the privilege of resorting to all such legitimate changes as may be fairly embodied within the spirit and scope of the invention as claimed.

What I claim is:

In combination with a tread member, a V-shaped gripping member carried by said tread member, the outer longitudinal edges of the gripping member being gradually inclined to the divergent ends thereof and constituting cutting edges, and securing lugs on the gripping member at the apex and the divergent ends thereof, as and for the purpose set forth.

In testimony whereof I hereunto affix my signature in the presence of two witnesses.

MARVEL M. JONES.

Witnesses:
W. C. RAY,
E. P. CAMPBELL.

Copies of this patent may be obtained for five cents each, by addressing the "Commissioner of Patents, Washington, D. C."